United States Patent [19]

Ewing

[11] Patent Number: 4,500,224
[45] Date of Patent: Feb. 19, 1985

[54] COUPLING FOR SUCKER ROD ASSEMBLY
[75] Inventor: Peter D. Ewing, Milford, Mich.
[73] Assignee: NSS, Industries, Inc., Plymouth, Mich.
[21] Appl. No.: 516,453
[22] Filed: Jul. 22, 1983
[51] Int. Cl.³ .............................................. F16B 7/18
[52] U.S. Cl. .................................. 403/343; 403/284; 403/299
[58] Field of Search .............. 403/343, 299, 46, 307, 403/284; 285/115, 81, 382

[56] References Cited

U.S. PATENT DOCUMENTS

| | | | |
|---|---|---|---|
| 1,326,259 | 12/1919 | Gunn et al. | 403/343 X |
| 2,045,520 | 6/1936 | Davison | 403/343 X |
| 2,059,175 | 10/1936 | Myracle | 403/46 |
| 3,489,445 | 1/1970 | Kammerer, Jr. | 403/343 |
| 4,084,829 | 4/1978 | Falchle et al. | 403/343 X |
| 4,097,163 | 6/1978 | Dubuque | 403/46 X |

Primary Examiner—Andrew V. Kundrat
Attorney, Agent, or Firm—Reising, Ethington, Barnard, Perry & Milton

[57] ABSTRACT

A sucker rod assembly is disclosed for use in oil well pumping apparatus. The assembly is constructed of a rod and a steel rod-end fitting. A unitary threaded head at the end of the rod is screwed into a socket in the rod-end fitting. The threaded head is of enlarged diameter and a tapered shoulder is provided at the juncture of the rod in the head. The fitting has a cylindrical socket with a threaded portion at the bottom and an unthreaded flange adjacent the outer end. After the head is screwed into the socket the flange is extruded into surface engagement with the tapered shoulder to provide a mechanical interlock between the rod and the fitting.

4 Claims, 3 Drawing Figures

COUPLING FOR SUCKER ROD ASSEMBLY

FIELD OF THE INVENTION

This invention relates to an improved sucker rod assembly for pumps and more particularly, it relates to an improved coupling between the sucker rod and the rod-end fitting.

BACKGROUND OF THE INVENTION

In oil well pumps, the walking beam at the well head is connected by a sucker rod to the pump at the bottom of the well. The sucker rod is usually of great length, often in excess of 10,000 feet and must be of high tensile strength to support even its own weight. Furthermore, the rod is immersed in the crude oil of the well which is highly corrosive. The rod for a well is made up of many individual rod-lengths which are joined end-to-end, each rod-length being about 25 feet long. The coupling used to join the rod-lengths typically uses a threaded fitting.

One of the difficulties encountered in long strings of sucker rod is the weight of the rod itself. In long strings, it is a common practice to use rods of successively smaller diameter from top to bottom of the string to provide the necessary tensile strength and minimize the weight of the rod at the bottom of the string. The weight of the string itself causes the individual rod-lengths to be elongated. When the rod is reciprocated during pumping the alternate loading and unloading of the rod causes cyclical stretching and, in some cases there is considerable disruption or interference with the stroking of the pump. In addition to the extremely high tensile stress and the cyclical loading, the rod is subjected to bending stress due to changes in the direction of the well casing. Thus, breakage of the sucker rod is not uncommon and it causes significant amounts of down time of the pumping apparatus while the rod is removed from the weld shaft and replaced.

One widely used structure of a rod-length is commonly known as a "three-piece rod". In this structure, the rod is threaded at both ends and a rod-end fitting is threadedly engaged with each end of the rod to form a three-piece assembly. The free end of the rod-end fitting is adapted for connection to another rod-end fitting. One form of three-piece rod assembly uses, on each end of the rod, a fitting which has a threaded male pin on the free end, such fitting being known as the "pin-end". With this, the three-piece rods are joined to each other by a conventional threaded coupling which is screwed onto adjoining pin-ends. In another form of three-piece rods, one end of the rod is fitted with a pin-end and the other end has a fitting with a threaded socket at its free end, the latter being called a "box-end". With this, the rods are joined together by screwing the pin-end of one into the box-end of the other.

In the prior art, sucker rods for use in oil wells are commonly made of steel, largely because of its high tensile strength. However, it does have the drawbacks of weight and susceptibility to corrosion. Attempts have been made to use fiber glass rods with the attendant advantages of lightweight and corrosion resistance. Also, it has been proposed to use aluminum rods to gain the advantages of lightweight, corrosion resistance and potential cost effectiveness. However, there is a need for a satisfactory coupling between the rod-lengths.

A general object of this invention is to provide an improved sucker rod assembly that overcomes certain disadvantages of the prior art.

SUMMARY OF THE INVENTION

In accordance with this invention, a sucker rod assembly is provided with an improved coupling between rod-lengths. This is accomplished by a coupling in which a unitary threaded head at the end of the rod is screwed into a socket in the rod-end fitting. The threaded head is of enlarged diameter and a tapered shoulder is provided at the juncture of the rod and the head. The rod-end fitting comprises a unitary body having a cylindrical socket with a threaded portion adjacent the bottom of the socket and an unthreaded flange adjacent the outer end of the socket. The threaded head is screwed into the socket and the flange of the socket is extruded into surface engagement with the tapered shoulder to provide a mechanical interlock between the rod and the rod-end fitting.

A more complete understanding of this invention will be obtained from the detailed description that follows taken with the accompanying drawings.

BEST MODE FOR CARRYING OUT THE INVENTION

Figure 1:
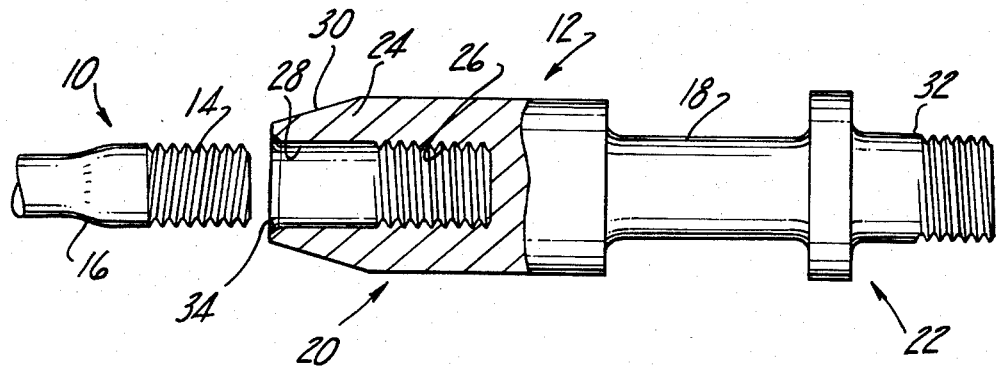
FIG. 1 is an elevation view partially in section of the rod and rod-end fitting before being assembled.

Referring now to the drawings, there is shown an illustrative embodiment of the invention in a particular three-piece sucker rod assembly for use in an oil well pump. In this embodiment, a sucker rod assembly is constructed of an aluminum rod and a steel rod-end fitting. It will be appreciated as the description proceeds that the invention may be used in different structural configurations and applications.

The sucker rod 10 and the rod-end fitting 12 are shown in FIG. 1 in spaced relation prior to threaded engagement. The rod 10 is constructed of an aluminum alloy which exhibits high tensile strength and fracture toughness and also good corrosion resistance. Further, it exhibits good extrudibility. The preferred aluminum alloy for the sucker rod is alloy 7129 currently available from Reynolds Aluminum Company of Roanoke, Va. The rod-end fitting 12 is preferably made from a medium carbon or alloy steel. Hot rolled steel such as SAE-1536 is an example of a preferred steel.

The end of the rod 10 is upset to form a head 14 of enlarged diameter. The resulting unitary head and rod are joined by a tapered shoulder 16 as a result of the upsetting operation. The head is threaded by roll-forming and the length of the threads on the head are approximately equal to the rod diameter. The roll-formed threads have a major diameter greater than the diameter of the unthreaded portion of the head.

The rod-end fitting 12 is a unitary body and is formed to the desired shape by a cold forming operation. It comprises a tool receiving shank 18 with connector portions 20 and 22 at opposite ends of the shank. The first connector portion 20 comprises a cylindrical socket 24 having a threaded portion 26 adjacent the bottom of the socket and an unthreaded portion or flange 28 adjacent the outer end of the socket. The second connector portion 22 comprises a threaded pin 32 and constitutes the pin-end of the fitting. It will be appreciated that the second connector portion 22 could take the form of a box-end of the fitting.

Prior to assembly and extrusion the flange 28 on the socket 24 has an inside diameter slightly larger than the threaded end of the rod 10. The outside diameter of the socket throughout its length is substantially uniform. The flange 28 has a chamfer 30 at its face end which is adapted for engagement with an extrusion die, as described subsequently. The tip of the flange 28 has an internal taper 34 to provide relief relative to the rod 10 after the flange 28 is extruded.

Figure 2:
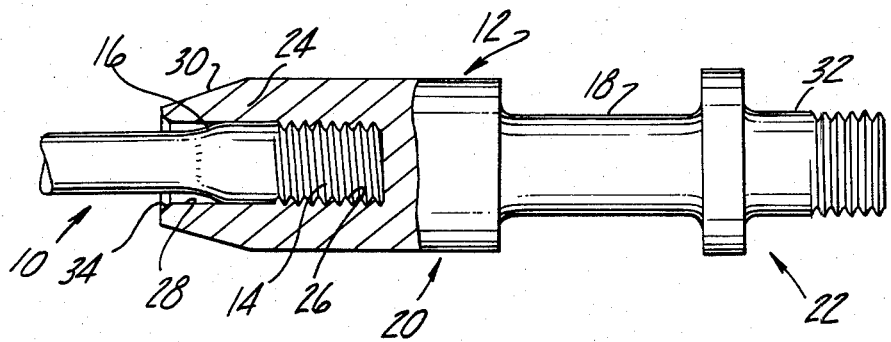
FIG. 2 is an elevation view of the rod and rod-end fitting with the two parts threadedly engaged.

The rod 10 is threadedly engaged in the socket of the rod-end fitting 12 as illustrated in FIG. 2. The threads on the rod 10 terminate adjacent the outer end of the threaded portion of the socket 24. If desired, an anerobic cement may be applied to the threads to provide a bond and to enhance the seal to be formed at the threads.

Figure 3:
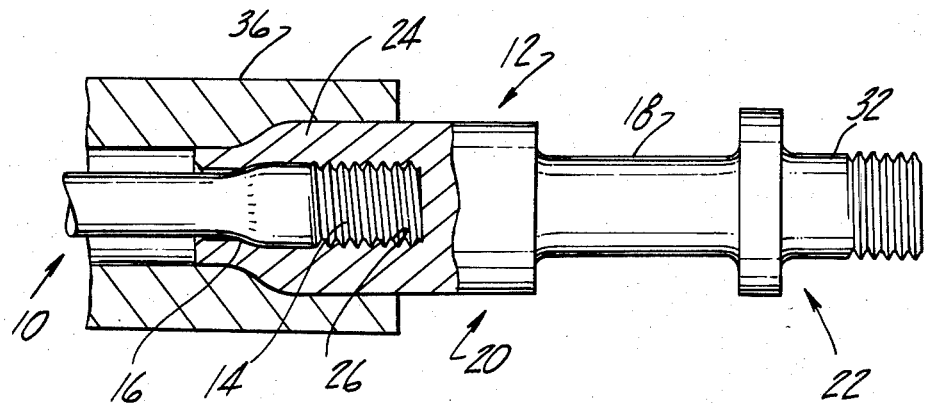
FIG. 3 is an elevation view showing the rod and the fitting disposed within an extruding tool after being extruded into its final configuration.

In order to complete the assembly, the flange 28 is cold formed by extrusion or swaging against the tapered shoulder 16 of the rod 10. This is done with a conventional extruding die 36 as illustrated in FIG. 3. The extruding die 36 is preferably constructed such that it will open to permit the rod assembly to be loaded laterally. The extruding die exerts a force on the flange 28 to deform it against the rod and the tapered shoulder 16 throughout the unthreaded portion of the head. This provides a close fitting surface engagement of the rod and the fitting with a positive mechanical interlock. This results in structural reinforcement in the vicinity of the threads and also provides a seal to exclude corrosive fluid from the threads. Preferably, the length of the flange 28 is about one-half inch for rod diameters in the range of five-eighths inch to one inch.

In order to protect the rod assembly against galvanic action, the rod-end fitting 12, including the inner surfaces, is provided with an aluminum coating. A preferred coating may be applied by plasma spraying to a thickness of about one thousandth of an inch. A suitable coating is sold under the trademark "ALUMAZITE E" by the Tiodize Company, Huntington Beach, Calif.

Although the description of this invention has been given with reference to a particular embodiment, it is not to be construed in the limiting sense. Many variations and modifications will now occur to those skilled in the art. For a definition of the invention reference is made to the appended claims.

What is claimed is:

1. A sucker rod assembly comprising:

a rod with a threaded head of enlarged diameter at one end thereof, said head and rod being unitary with a tapered shoulder at the juncture thereof, the major diameter of the threads on said threaded head being greater than the diameter of an unthreaded portion of the head, a rod-end fitting comprising a unitary body including a tool receiving shank, a first connector portion at one end of said shank and a second connector portion at the other end of said shank, said first connector portion comprising a socket having a threaded portion adjacent the bottom of said socket and an unthreaded flange adjacent the outer end of said socket, said threaded head being threadedly engaged with the threaded portion of said socket, said unthreaded flange of said socket being disposed in surface engagement with said tapered shoulder, whereby said rod and rod-end fitting are mechanically interlocked in close fitting surface engagement.

2. The invention as defined in claim 1 wherein, the unthreaded flange terminates in an internally beveled end.

3. The invention as defined in claim 1 wherein said flange is extruded into surface engagement with said tapered shoulder.

4. A sucker rod assembly comprising:

an aluminum rod with a threaded head of enlarged diameter at one end thereof, said head and rod being unitary with a tapered shoulder at the juncture thereof, a steel rod-end fitting comprising a unitary body including a tool receiving shank, a first connector portion at one end of said shank and a second connector portion at the other end of said shank, an aluminum coating on said rod-end fitting for reducing galvanic action between it and said rod, said first connector portion comprising a socket having a threaded portion adjacent the bottom of said socket and an unthreaded flange adjacent the outer end of said socket, said threaded head being threadedly engaged with the threaded portion of said socket, said unthreaded flange of said socket being disposed in surface engagement with said tapered shoulder, whereby said rod and rod-end fitting are mechanically interlocked in close fitting surface engagement.

* * * * *